United States Patent
Shrestha et al.

(10) Patent No.: US 12,096,338 B2
(45) Date of Patent: *Sep. 17, 2024

(54) CELL BARRING PROCEDURE IN NTN

(71) Applicant: QUALCOMM Incorporated, San Diego, CA (US)

(72) Inventors: Bharat Shrestha, San Diego, CA (US); Umesh Phuyal, San Diego, CA (US); Mungal Singh Dhanda, Slough (GB); Alberto Rico Alvarino, San Diego, CA (US); Ayan Sengupta, San Diego, CA (US); Liangping Ma, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,175

(22) Filed: Jun. 5, 2023

(65) Prior Publication Data
US 2023/0319686 A1    Oct. 5, 2023

Related U.S. Application Data

(63) Continuation of application No. 17/219,791, filed on Mar. 31, 2021, now Pat. No. 11,706,691.

(51) Int. Cl.
*H04W 48/02* (2009.01)
*H04B 7/185* (2006.01)
(Continued)

(52) U.S. Cl.
CPC ........ *H04W 48/02* (2013.01); *H04B 7/18565* (2013.01); *H04W 48/08* (2013.01); *H04W 48/20* (2013.01)

(58) Field of Classification Search
CPC ..... H04W 48/02; H04W 48/08; H04W 48/20; H04B 7/18565; H04B 7/18513;
(Continued)

(56) References Cited

U.S. PATENT DOCUMENTS

2011/0200014 A1 *  8/2011  Lee ................... H04W 36/0058
                                                    370/332
2015/0382226 A1 * 12/2015  Jung .................... H04W 24/10
                                                    370/252
(Continued)

FOREIGN PATENT DOCUMENTS

KR      20200085986 A      7/2020
WO      2020197271 A1     10/2020
(Continued)

OTHER PUBLICATIONS

Kodheli, Oltjon, et al. "Random access procedure over non-terrestrial networks: From theory to practice." IEEE Access 9 (2021): 109130-109143 (Year: 2021).*
(Continued)

*Primary Examiner* — Sharad Rampuria
(74) *Attorney, Agent, or Firm* — Procopio, Cory, Hargreaves & Savitch LLP

(57) ABSTRACT

A UE may receive, from at least one cell via at least one bit in a MIB or a SIB, a barring indication based on a supported network of the at least one cell and a supported network of the UE. The supported network of the at least one cell may correspond to a TN or an NTN, and the supported network of the UE may correspond to a TN or an NTN. The UE may skip, based on the received barring indication, a selection of the at least one cell for communication. Accordingly, the UE may not camp on the at least one cell. The barring indication for NTN-supporting UEs and for TN-supporting UEs may be separately indicated via the MIB or the SIB.

26 Claims, 9 Drawing Sheets

(51) Int. Cl.
*H04W 48/08* (2009.01)
*H04W 48/20* (2009.01)

(58) Field of Classification Search
CPC ............ H04B 7/18539; H04B 7/18563; H04B 7/2041; H04B 7/216
See application file for complete search history.

(56) References Cited

U.S. PATENT DOCUMENTS

| | | |
|---|---|---|
| 2019/0357092 A1 | 11/2019 | Jung et al. |
| 2020/0245224 A1 | 7/2020 | Agiwal |
| 2021/0105761 A1 | 4/2021 | Cheng et al. |
| 2021/0160760 A1 | 5/2021 | Agiwal |
| 2021/0194740 A1* | 6/2021 | Aldana ............. H04W 72/1268 |
| 2022/0078746 A1 | 3/2022 | Lee et al. |
| 2022/0322205 A1 | 10/2022 | Shrestha et al. |

FOREIGN PATENT DOCUMENTS

| | | |
|---|---|---|
| WO | 2021257856 A1 | 12/2021 |
| WO | 2022153238 A1 | 7/2022 |

OTHER PUBLICATIONS

Foni S., et al. "Evaluation Methodologies for the NB-IOT System: Issues and Ongoing Efforts", 2017 AEIT International Annual Conference, IEEE, 6 Pages, Sep. 2017.

International Search Report and Written Opinion—PCT/US2022/018124—ISA/EPO—Jun. 10, 2022.

Sengupta A., et al., "Cellular Terrestrial Broadcast-Physical Layer Evolution from 3GPP Release 9 to Release 16", IEEE Transactions on Broadcasting, vol. 66, No. 2, 12 Pages, pp. 459-470, 2020.

* cited by examiner

CELL BARRING PROCEDURE IN NTN

CROSS REFERENCE TO RELATED APPLICATION(S)

This application is a Continuation of U.S. Non-provisional application Ser. No. 17/219,791, entitled "CELL BARRING PROCEDURE IN NTN" and filed Mar. 31, 2021, which is expressly incorporated by reference herein in their entirety.

BACKGROUND

Technical Field

The present disclosure relates generally to communication systems, and more particularly, to barring access to a cell in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from at least one cell via at least one bit in a master information block (MIB) or a system information block (SIB), a barring indication based on a supported network of the at least one cell and a supported network of the UE. The supported network of the at least one cell may correspond to a terrestrial network (TN) or a non-terrestrial network (NTN), and the supported network of the UE may correspond to a TN or an NTN. The apparatus may skip, based on the received barring indication, a selection of the at least one cell for communication.

In an aspect of the disclosure, a method, a computer-readable medium, and an apparatus are provided. The apparatus may be a cell/base station. The apparatus may determine whether to bar at least one UE from selecting the cell for communication based on a supported network of the cell and a supported network of the at least one UE. The supported network of the cell may correspond to a TN or an NTN, and the supported network of the at least one UE may correspond to a TN or an NTN. The apparatus may transmit, to the at least one UE via at least one bit in a MIB or a SIB, a barring indication based on the supported network of the cell and the supported network of the at least one UE. The apparatus may bar, based on the transmitted barring indication, the at least one UE from selecting the cell for communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
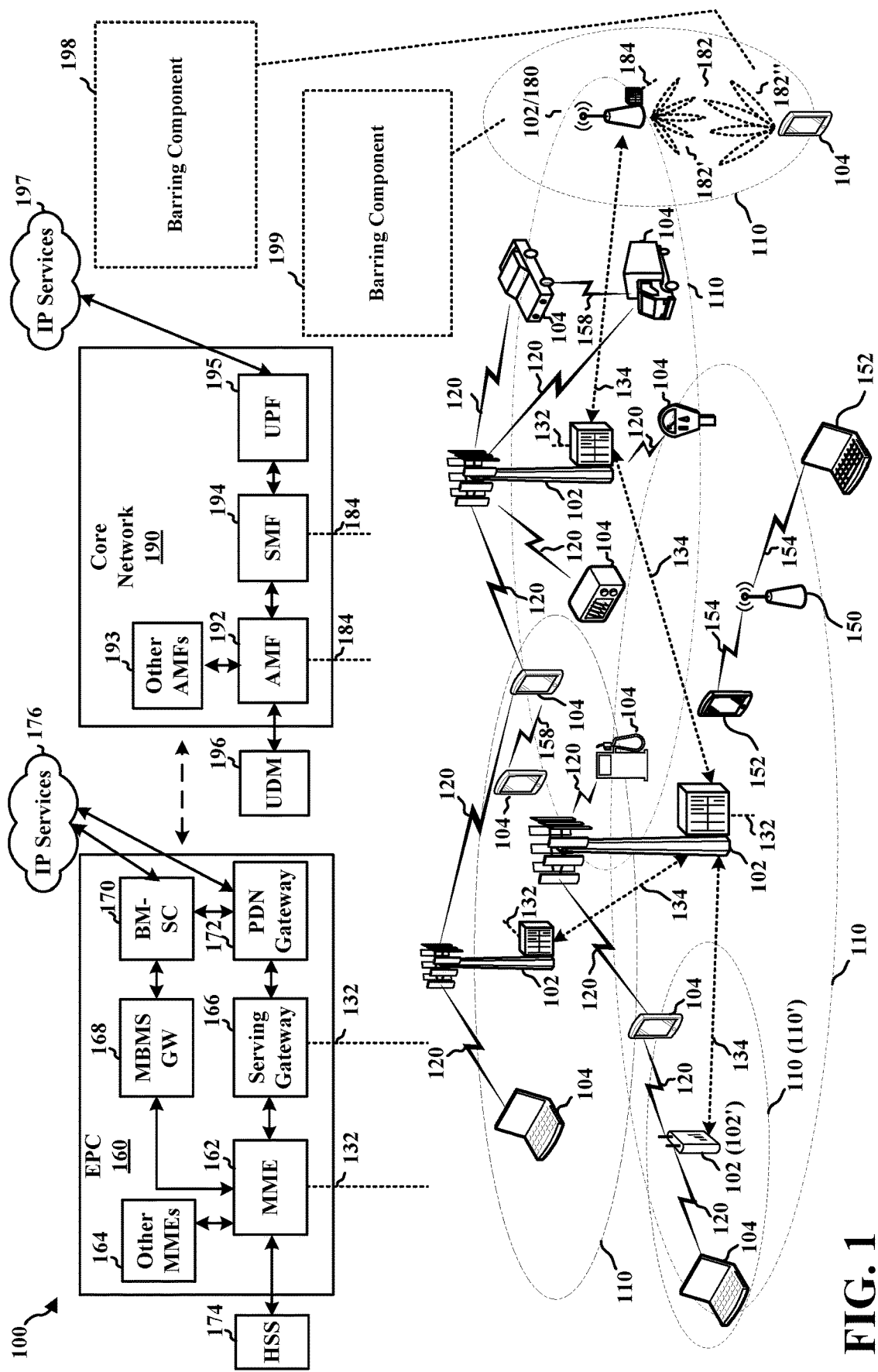
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
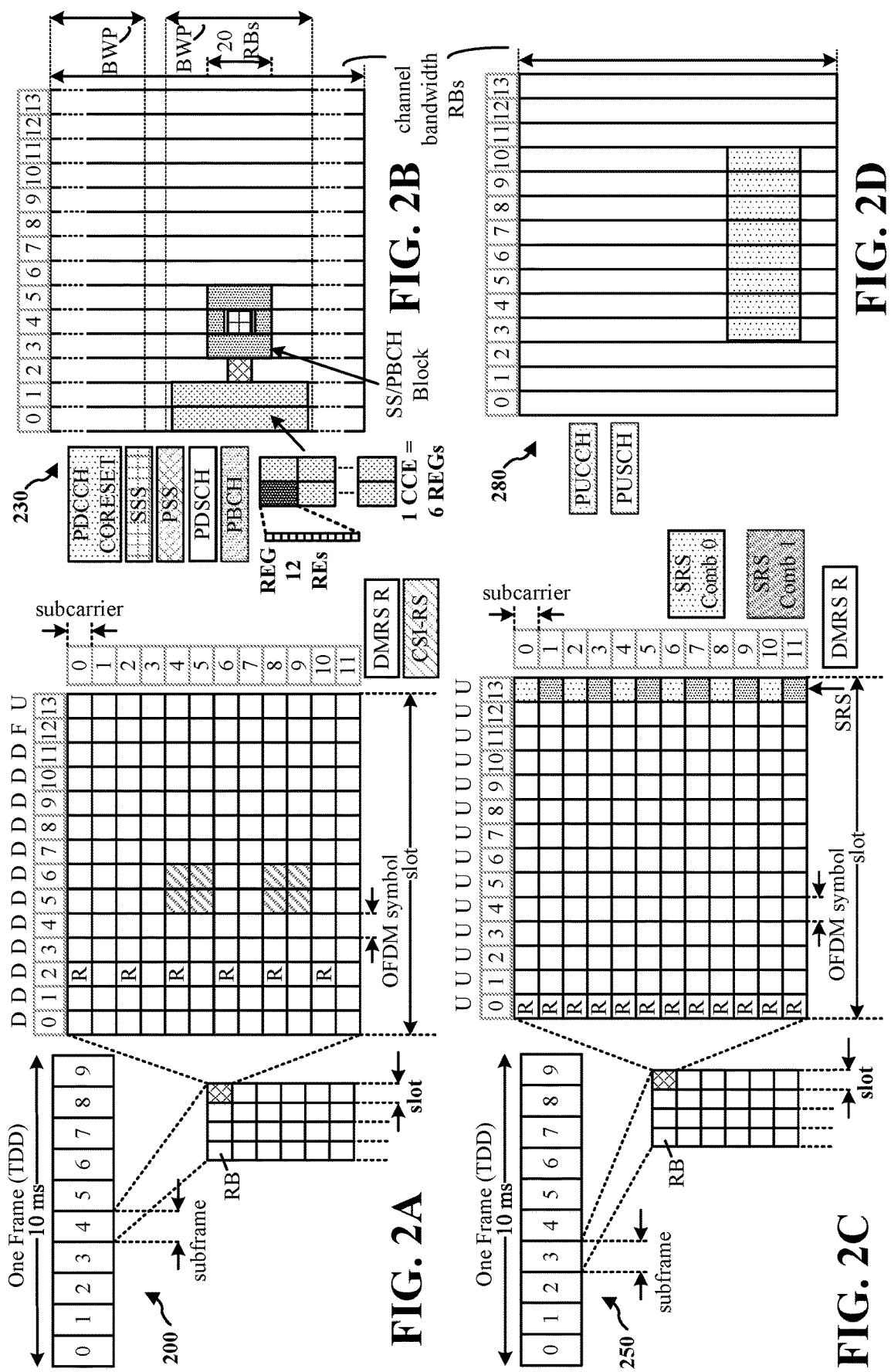
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

Referring again to FIG. 1, in certain aspects, the UE 104 may include a barring component 198 that may be configured to receive, from at least one cell via at least one bit in a MIB or a SIB, a barring indication based on a supported network of the at least one cell and a supported network of the UE. The supported network of the cell may correspond to a TN or an NTN, and the supported network of the at least one UE may correspond to a TN or an NTN. The barring component 198 may be configured to skip, based on the received barring indication, a selection of the at least one cell for communication. In certain aspects, the base station/cell 180 may include a barring component 199 that may be configured to determine whether to bar at least one UE from selecting the cell for communication based on a supported network of the cell and a supported network of the at least one UE. The supported network of the cell may correspond to a TN or an NTN, and the supported network of the at least one UE may correspond to a TN or an NTN. The barring component 199 may be configured to transmit, to the at least one UE via at least one bit in a MIB or a SIB, a barring indication based on the supported network of the cell and the supported network of the at least one UE. The barring component 199 may be configured to bar, based on the transmitted barring indication, the at least one UE from selecting the cell for communication. Although the following description may be focused on 5G NR, the concepts described herein may be applicable to other similar areas, such as LTE, LTE-A, CDMA, GSM, and other wireless technologies FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
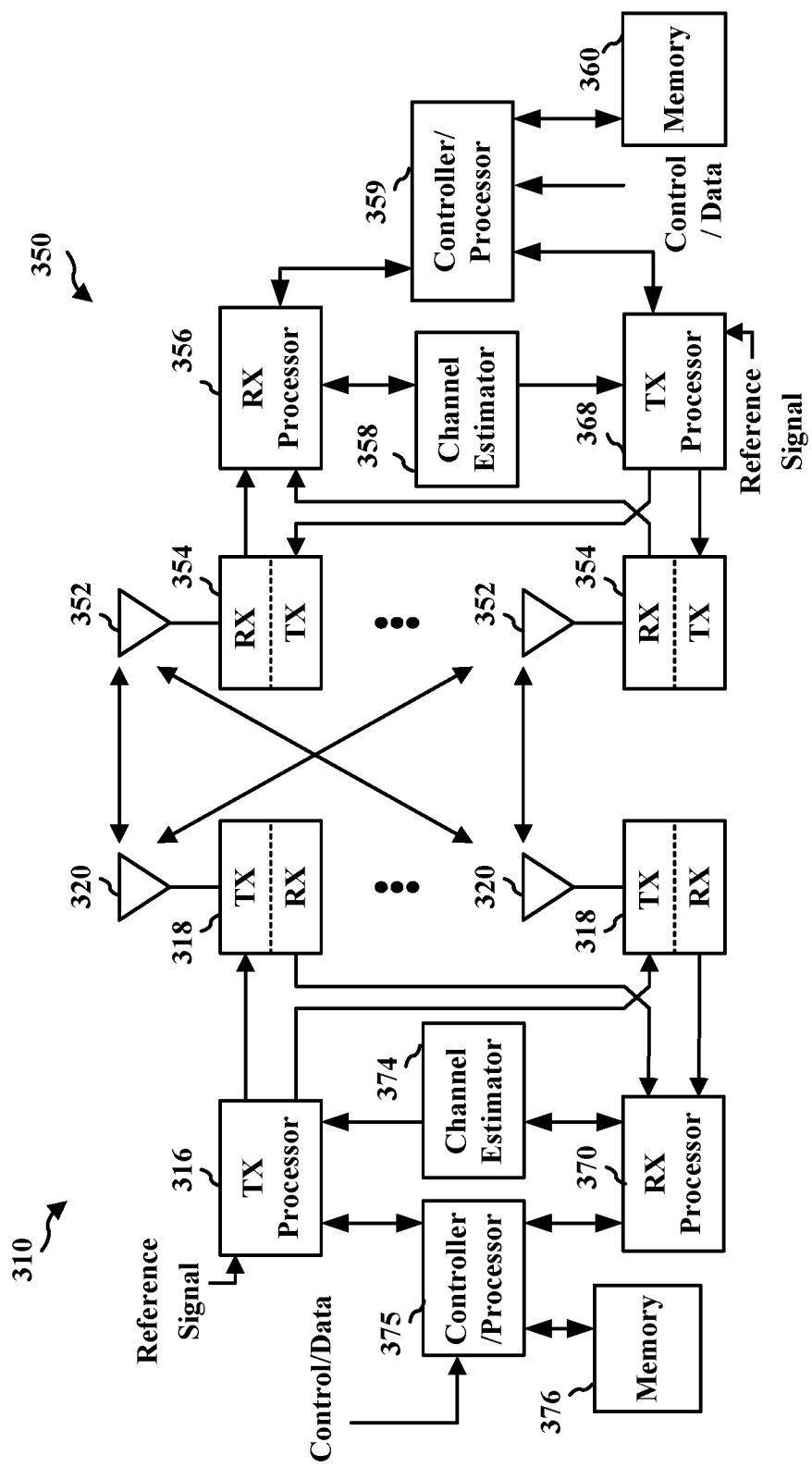
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
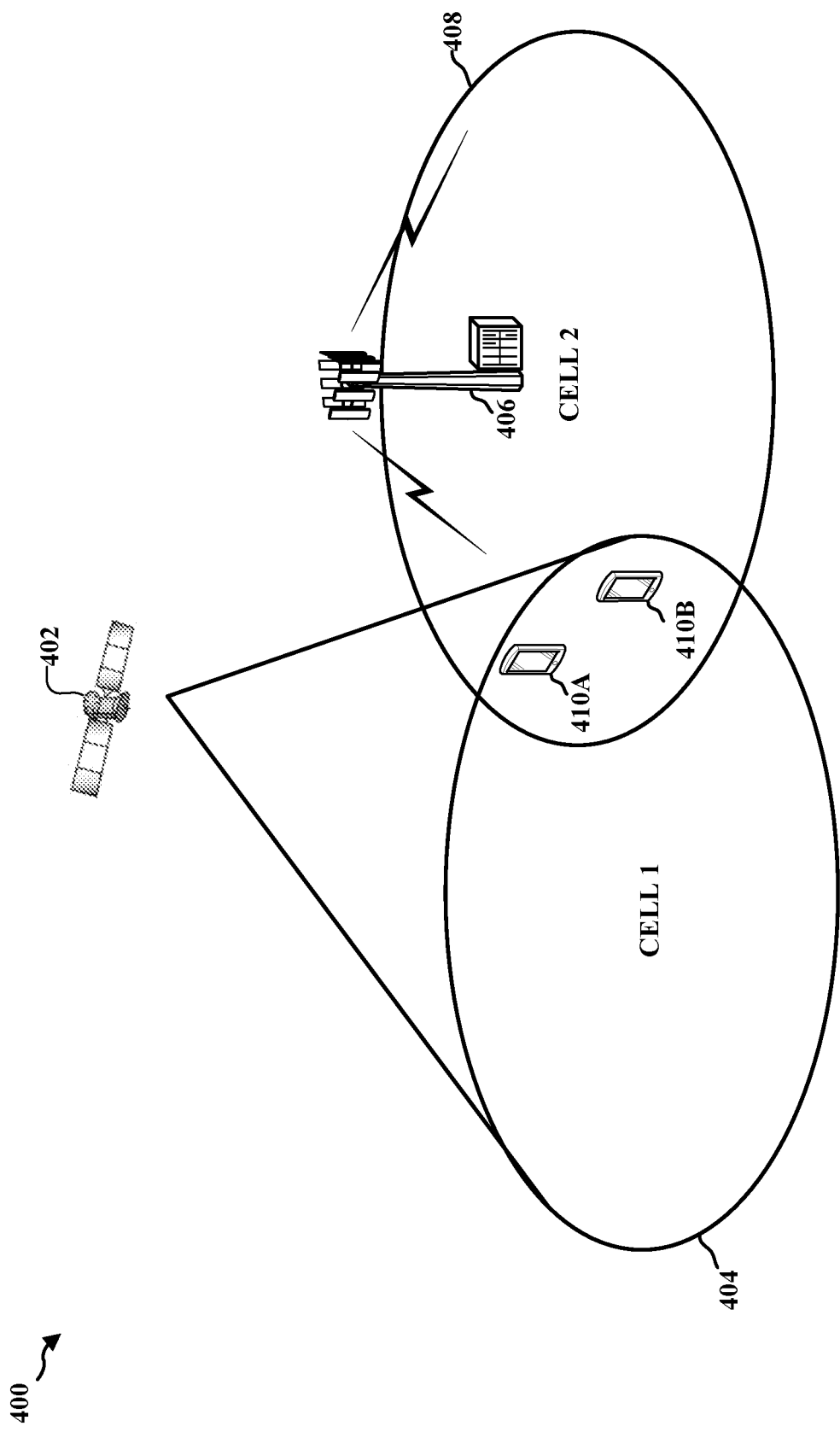
FIG. 4 is a diagram illustrating an example environment.

FIG. 4 is a diagram illustrating an example environment 400. In an NTN, an NTN cell, such as the first cell 404, may be enabled by a communication satellite, such as the communication satellite/space vehicle 402. A TN cell (e.g., the second cell 408) may be enabled by a terrestrial base station (e.g., the base station 406). The space vehicle enabling the NTN cell may be one of a high altitude pseudo-satellite (HAPS), a low earth orbit (LEO) satellite, a medium earth orbit (MEO) satellite, or a geostationary (GEO) satellite. An NTN cell may be a moving cell that may move as the space vehicle moves across the sky. Alternatively, the space vehicle may steer the transmit and receive beams as the space vehicle moves across the sky such that the NTN cell enabled on and near the surface of the earth is fixed relative to the earth. A fixed NTN cell may also be enabled by a GEO satellite.

It may be advantageous to inform the UE whether the network is a TN or an NTN no later than the reception of a SIB 1. The TN cells and the NTN cells may be deployed in the same band over a same geographical area, and absent additional indications, a UE 410A, 410B may detect and camp on a cell that is not suitable for the UE. For example, a UE 410A that is expected to communicate with and camp on a TN cell and does not support an NTN cell (which may be referred to herein as a TN-supporting UE) may inappropriately detect and camp on an NTN cell. This may occur as existing TN-supporting UEs may not understand newly introduced fields or parameters (e.g., the satellite specific parameters) in the MIB or the SIB, and may ignore the newly introduced fields or parameters and camp inappropriately on the NTN cell. Similarly, a UE 410B that is expected to communicate with and camp on an NTN cell (which may be referred to herein as an NTN-supporting UE) may inappropriately detect and camp on a TN cell. Therefore, it may be beneficial for an NTN cell to bar TN-supporting UEs but not NTN-supporting UEs, and for a TN cell to bar NTN-supporting UEs but not TN-supporting UEs.

Figure 5:
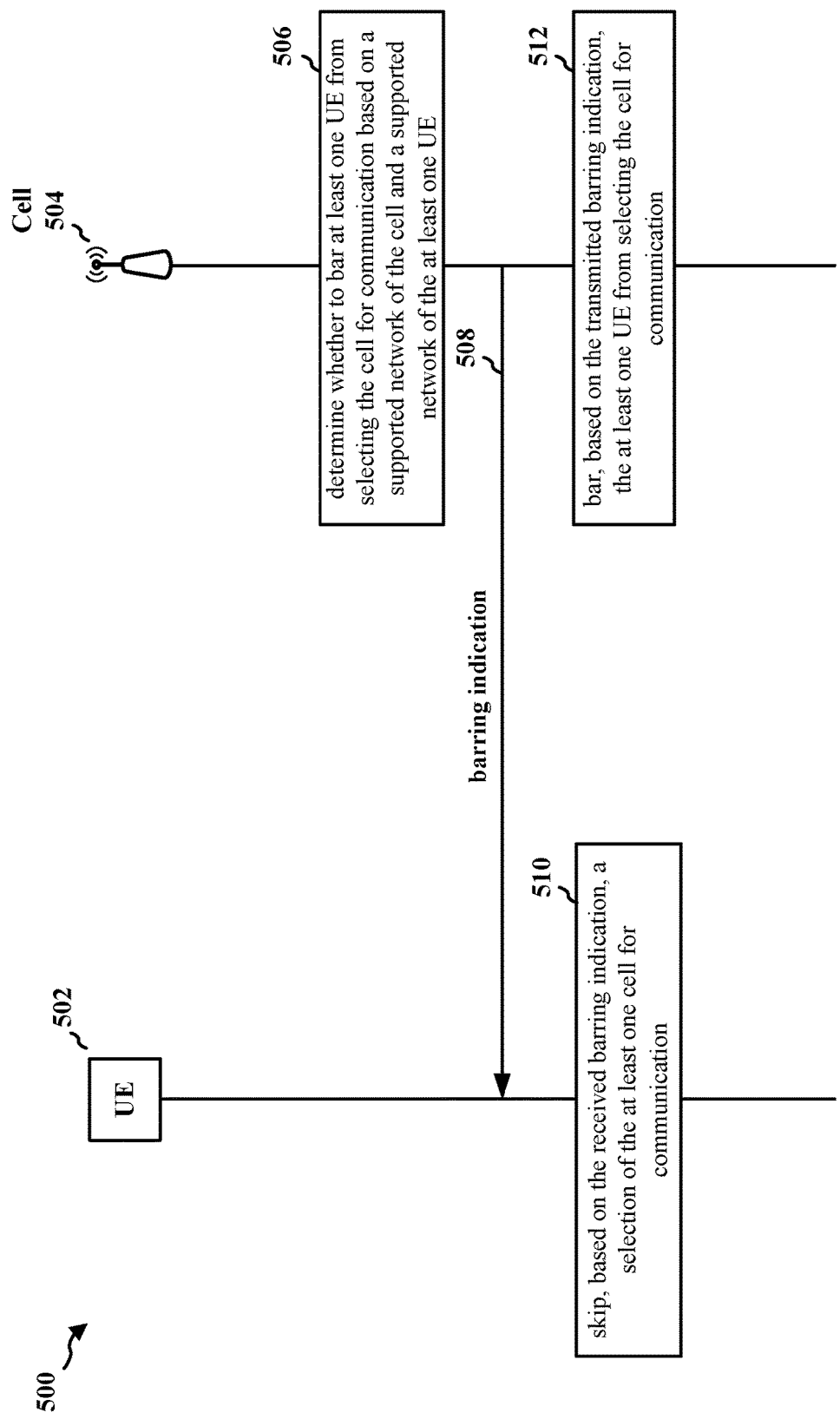
FIG. 5 illustrates a communication flow of a wireless communication system.

FIG. 5 illustrates a communication flow 500 of a wireless communication system. At 506, the cell 504 may determine whether to bar at least one UE 502 from selecting the cell 504 for communication based on a supported network of the cell 504 and a supported network of the at least one UE 502. The supported network of the cell may correspond to a TN or an NTN, and the supported network of the at least one UE may correspond to a TN or an NTN.

At 508, the cell 504 may transmit to the at least one UE 502, and the UE 502 may receive, from at least one cell 504, via at least one bit in a MIB or a SIB, a barring indication based on the supported network of the cell 504 and the supported network of the at least one UE 502.

At 510, the UE 502 may skip, based on the received barring indication, a selection of the at least one cell 504 for communication. At 512, the cell 504 may bar, based on the transmitted barring indication, the at least one UE 502 from selecting the cell 504 for communication.

In one configuration, the communication may correspond to the at least one UE 502 camping on the cell 504. Therefore, once barred from the cell 504, the UE 502 may not camp on the cell 504.

In one configuration, the at least one UE 502 may be barred from selecting the cell 504 for communication for a time period (e.g., 300 s). This may be useful for a temporary barring of NTN access. The bar may end after the time period expires, and the UE 502 may then consider the cell 504 for cell reselection. When a LEO satellite enabled cell 504 is barred for NTN access, a shorter barring duration (e.g., <300 s) may be used based on the cell visibility duration (e.g., the cell size) or the satellite revisit time.

In one configuration, the at least one UE may be barred from selecting the cell for communication for a duration of the UE storing information about barring access to the cell, and the information about barring access to the cell includes at least one of a physical cell identifier (PCID) or a frequency of the cell. Thus, if the cell 504 is barred for NTN-supporting UEs 502 for NTN access, the cell 504 is accessible to TN-supporting UEs 502 but not to NTN-supporting UEs 502. Conversely, if the cell 504 is barred for TN-supporting UEs 502 for TN access, the cell 504 is accessible to NTN-supporting UEs 502 but not to TN-supporting UEs 502.

In one configuration, a TN-supporting UE of the at least one UE may be barred from selecting the cell for communication when the cell is an NTN-supporting cell, and an NTN-supporting UE of the at least one UE may be barred from selecting the cell for communication when the cell is a TN-supporting cell.

In one configuration, NTN-supporting UEs may ignore the legacy barring indication in the MIB (e.g., the first barring indication in the MIB, the "cellBarred" parameter in the MIB), and TN-supporting UEs may follow the legacy barring indication in the MIB (e.g., the first barring indication in the MIB) as normal. A spare bit in the MIB may be used to introduce a new NTN-specific barring indication (e.g., the second barring indication in the MIB) that may be applicable to NTN-supporting UEs or NTN access but not to TN-supporting UEs. Therefore, whether NTN access is barred for NTN-supporting UEs may be based on the new NTN-specific barring indication (e.g., the second barring indication in the MIB). In particular, for example, if the second barring indication in the MIB is set to 0, NTN-supporting UEs may be barred (including in a cell with a conventional TN base station). If the second barring indication in the MIB is set to 1, NTN access by NTN-supporting UEs may be allowed. In another example, the bit definition of the second barring indication in the MIB may be reversed. The TN-supporting UEs in the TN access mode may still use the legacy barring indication in the MIB and may ignore the new NTN-specific barring indication in the MIB. Accordingly, a UE (whether a TN-supporting UE or an NTN-supporting UE) may learn the cell type (e.g., whether the cell is barred or allowed) from the MIB without acquiring the SIB 1, and power may be saved. This configuration may be applicable to NR. Accordingly, a TN-supporting UE 502 may be barred or not barred from selecting the cell 504 for communication based on a first barring indication in the MIB regardless of a second barring indication in the MIB, and an NTN-supporting UE 502 may be barred or not barred from selecting the cell 504 for communication based on the second barring indication in the MIB regardless of the first barring indication in the MIB.

In one configuration, a reserved bit in the MIB may be used to introduce a cell type indication. In another configuration, an existing bit in the MIB may be repurposed to introduce the cell type indication. For example, a bit value of 0 at the cell type indication may indicate a TN cell type, and bit value of 1 may indicate an NTN cell type. In another example, the bit definition of the cell type indication may be reversed. An indication of a TN cell type may bar NTN-supporting UEs from access. The existing barring indication in the SIB 1 (e.g., the third barring indication in the SIB 1, the "Unified Access Barring (UAC)-Barring Information" in the SIB 1) may be used as normal by NTN-supporting UEs (and by TN-supporting UEs). This configuration may be applicable to enhanced machine type communication (eMTC) or narrowband (NB)-internet of things (IoT) (NB-IoT). Accordingly, the MIB may include a cell type indication indicative of the cell 504 as being either a TN-supporting cell or an NTN-supporting cell, and an NTN-supporting UE 502 may be barred or not barred from selecting the cell for communication based on the cell type indication and a third barring indication in a SIB 1. The NTN-supporting UE 502 may be barred from selecting the cell 504 for communication based on the cell type indication indicative of the cell as being a TN-supporting cell.

In one configuration, a reserved bit in the MIB may be used to introduce a new barring indication (e.g., a fourth barring indication in the MIB). For example, a bit value of 0 at the fourth barring indication may indicate the cell is barred (e.g., existing or eNB TN type cell may bar NTN-supporting UEs), and a bit value of 1 may indicate the cell is not barred. In another example, the bit definition of the fourth barring indication may be reversed. The existing barring indication in the SIB 1 (e.g., the third barring indication in the SIB 1; the "Unified Access Barring (UAC)-Barring Information" in the SIB 1) may be used by TN-supporting UEs or existing UEs but not by NTN-supporting UEs (e.g., the NTN-supporting UEs may ignore the existing barring indication in the SIB 1). This configuration may be applicable to eMTC or NB-IoT.

Accordingly, a TN-supporting UE 502 may be barred or not barred from selecting the cell 504 for communication based on a third barring indication in a SIB 1 regardless of a fourth barring indication in the MIB, and an NTN-supporting UE 502 may be barred or not barred from selecting the cell 504 for communication based on the fourth barring indication in the MIB regardless of the third barring indication in the SIB 1.

In one configuration, for eMTC, the "phich-Config" parameter in the MIB may be repurposed for indicating a cell type or a cell barring indication. In one configuration, for eMTC, a whole MIB (e.g., the MasterInformationBlock-MBMS-r14 block) may be repurposed for the NTN access.

In one configuration, the barring indication in the MIB (e.g., the first barring indication in the MIB, the "cellBarred" parameter in the MIB) may be applicable to NTN-supporting UEs for NTN access. The first barring indication in the MIB may be applicable to all UEs, both TN-supporting and NTN-supporting. In addition, if the "ssb-SubcarrierOffset" parameter in the MIB indicates that this cell does not provide a SIB 1, the indication may mean that the cell is barred for NTN access (but not for TN access) even if the existing barring indication (e.g., the first barring indication in the MIB, the "cellBarred" parameter in the MIB) does not indicate a bar. Alternatively, if the MIB is not associated with an SSB, then the cell may be considered barred for NTN access. This configuration may be applicable to NR Accordingly, a TN-supporting UE 502 may be barred or not barred from selecting the cell 504 for communication based on a first barring indication in the MIB, and an NTN-supporting UE 502 may be barred or not barred from selecting the cell 504 for communication based on the first barring indication in the MIB and at least one additional indication in the MIB. The NTN-supporting UE 502 may be barred from selecting the cell 504 for communication based on the first barring indication in the MIB indicative of a bar or the at least one additional indication in the MIB indicative of an absence of a SIB 1 in the cell 504.

In one configuration, one or more parameters may be used together to determine whether the cell is barred or not barred for NTN-supporting UEs. The "cellBarred" parameter in the MIB (e.g., the first barring indication in the MIB) alone may not be sufficient to bar NTN-supporting UEs for NTN access. NT-supporting UEs may follow the "cellBarred" parameter in the MIB (e.g., the first barring indication in the MIB) as normal. NTN-supporting UEs may not be barred when the "cellBarred" parameter in the MIB (e.g., the first barring indication in the MIB) does not indicate a bar. Further, one or more additional parameters, e.g., a spare bit, the "intraFreqReselection" parameter, the "pdcch-ConfigSIB1" parameter, or the "ssb-SubcarrierOffset" parameter in the MIB may be used to indicate whether NTN-supporting UEs are barred when the "cellBarred" parameter in the MIB (e.g., the first barring indication in the MIB) does indicate a bar. For example, the "cellBarred" parameter may indicate a bar and the field "ssb-SubcarrierOffset" may indicate that the SIB 1 is absent, then NTN-supporting UEs may be barred from accessing the cell. In another example, when the "cellBarred" parameter indicate a bar, whether NTN-supporting UEs are barred or allowed may be based on the value of a new indication introduced using a spare bit in the MIB. For example, NTN-supporting UEs may be barred when the new indication is set to 0, and may be allowed when the new indication is set to 1. In another example, the bit definition of the new indication in the MIB may be reversed. If an NTN-supporting UE finds both an NTN cell and a TN cell, the NTN-supporting UE may prioritize the selection of the TN cell over the NTN cell. If a TN cell (e.g., an existing cell) indicates cell barring via the "cellBarred" parameter in the MIB (e.g., the first barring indication in the MIB), then the TN cell may not be barred for all UEs (TN-supporting UEs and NTN-supporting UEs) (e.g., TN-supporting UEs may be barred, whereas NTN-supporting UEs may be allowed). In other words, a TN cell may not selectively bar TN-supporting UEs or NTN-supporting UEs, but an NTN cell may selectively bar TN-supporting UEs or NTN-supporting UEs. This configuration may be applicable to NR. Accordingly, a TN-supporting UE 502 may be barred or not barred from selecting the cell 504 for communication based on a first barring indication in the MIB, and an NTN-supporting UE 502 may be barred or not barred from selecting the cell 504 for communication based on at least one additional indication in the MIB when the first barring indication in the MIB indicates a bar. The NTN-supporting UE 502 may not be barred from selecting the cell 504 for communication when the first barring indication in the MIB does not indicate a bar. The NTN-supporting UE 502 may be barred from selecting the cell 504 for communication based on the at least one additional indication in the MIB indicative of a bar of NTN-supporting UEs when the first barring indication in the MIB indicates a bar.

In one configuration, the barring indication in MIB (e.g., the first barring indication in the MIB, the "cellBarred" parameter in the MIB) may be ignored by NTN-supporting UEs for NTN access. In other words, the first barring indication in the MIB may be applicable to legacy or TN access by TN-supporting UEs. If the SIB1 does not schedule a new NTN specific SIB, or does not schedule a SIB that provides satellite specific information (e.g., ephemeris), the cell may be barred for NTN-supporting UEs or NTN access. Accordingly, a TN-supporting UE 502 may be barred or not barred from selecting the cell 504 for communication based on a first barring indication in the MIB, and an NTN-supporting UE 502 may be barred or not barred from selecting the cell 504 for communication based on a SIB 1 regardless of the first barring indication in the MIB. The NTN-supporting UE 502 may be barred from selecting the cell 504 for communication based on the SIB 1 not scheduling at least one additional SIB including NTN-related information regardless of the first barring indication in the MIB.

In one configuration, the barring indication in MIB (e.g., the first barring indication in the MIB, the "cellBarred" parameter in the MIB) may be ignored by NTN-supporting UEs for NTN access. At least one indication in the SIB 1, such as the "cellReservedForOperatorUse" parameter, the "cellReservedForOtherUse" parameter, or the "cellReservedForFutureUse" parameter indicated in the SIB 1 may be used for barring the NTN-supporting UEs for NTN access. Accordingly, the NTN-supporting UE 502 may be barred or not barred from selecting the cell 504 for communication based on an indication in the SIB 1 regardless of the first barring indication in the MIB.

In one configuration, a TN-supporting UE 502 may be barred or not barred from selecting the cell 504 for communication based on a first barring indication in the MIB, and based further on the indication in the SIB 1 (e.g., "cellReservedForOperatorUse" parameter, the "cellReservedForOtherUse" parameter, or the "cellReservedForFutureUse" parameter).

In one configuration, a new barring indication (e.g., a fifth barring indication in the SIB 1) for NTN-supporting UEs for NTN access may be introduced in the SIB 1. Accordingly, an NTN-supporting UE 502 may be barred or not barred from selecting the cell 504 for communication based on the fifth barring indication in the SIB 1. The fifth barring indication in the SIB 1 may be indicative of whether at least one of NTN LEO access or NTN GEO access is barred.

In one configuration, the existing cell barring indication, the "cellBarred" parameter in the SIB 1 (e.g., the third barring indication in the SIB 1) may be ignored by NTN-supporting UEs. A new barring indication (e.g., a fifth barring indication in the SIB 1) for NTN-supporting UEs for NTN access may be introduced in the SIB 1 (e.g., a "cellBarredNTN-r1xa" parameter in the SIB 1). This configuration may be applicable to eMTC or NB-IoT. Accordingly, a TN-supporting UE 502 may be barred or not barred from selecting the cell 504 for communication based on a third barring indication in a SIB 1 regardless of a fifth barring indication in the SIB 1, and an NTN-supporting UE 502 may be barred or not barred from selecting the cell 504 for communication based on the fifth barring indication in the SIB 1 regardless of the third barring indication in the SIB 1.

Figure 6:
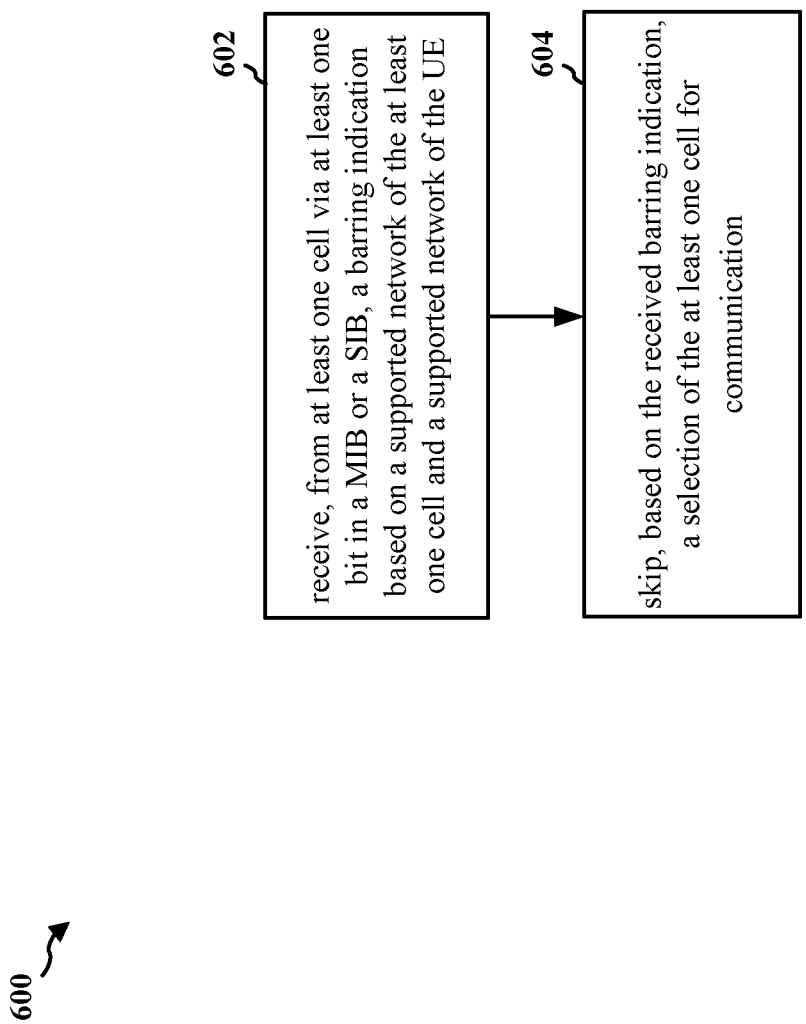
FIG. 6 is a flowchart of a method of wireless communication.

FIG. 6 is a flowchart 600 of a method of wireless communication. The method may be performed by a UE (e.g., the UE 104/350/410/502; the apparatus 802). At 602, the UE may receive, from at least one cell via at least one bit in a MIB or a SIB, a barring indication based on a supported network of the at least one cell and a supported network of the UE. The supported network of the cell may correspond to a TN or an NTN, and the supported network of the at least one UE may correspond to a TN or an NTN. For example, 602 may be performed by the barring component 840 in FIG. 8. Referring to FIG. 5, at 508, the UE 502 may receive, from at least one cell 504 via at least one bit in a MIB or a SIB, a barring indication based on a supported network of the at least one cell 504 and a supported network of the UE 502.

At 604, the UE may skip, based on the received barring indication, a selection of the at least one cell for communication. For example, 604 may be performed by the barring component 840 in FIG. 8. Referring to FIG. 5, at 510, the UE 502 may skip, based on the received barring indication, a selection of the at least one cell 504 for communication.

In one configuration, the communication may correspond to the at least one UE camping on the at least one cell. Referring to FIG. 5, the communication may correspond to the at least one UE 502 camping on the at least one cell 504.

In one configuration, the at least one UE may be barred from selecting the at least one cell for communication for a time period. The at least one UE may select the at least one cell for communication after the time period.

In one configuration, the at least one UE may be barred from selecting the at least one cell for communication for a duration of the UE storing information about barring access to the at least one cell, and the information about barring access to the at least one cell may include at least one of a PCID or a frequency of the at least one cell.

In one configuration, when the UE is a TN-supporting UE, the UE may be barred from selecting the at least one cell for communication when the at least one cell is an NTN-supporting cell, and when the UE is an NTN-supporting UE, the UE may be barred from selecting the at least one cell for communication when the at least one cell is a TN-supporting cell.

In one configuration, when the UE is a TN-supporting UE, the UE may be barred or not barred from selecting the at least one cell for communication based on a first barring indication in the MIB regardless of a second barring indication in the MIB, and when the UE is an NTN-supporting UE, the UE may be barred or not barred from selecting the at least one cell for communication based on the second barring indication in the MIB regardless of the first barring indication in the MIB.

In one configuration, the MIB may include a cell type indication indicative of the at least one cell as being either a TN-supporting cell or an NTN-supporting cell, and when the UE is an NTN-supporting UE, the UE may be barred or not barred from selecting the at least one cell for communication based on the at least one cell type indication and a third barring indication in a SIB 1, and the UE may be barred from selecting the at least one cell for communication based on the at least one cell type indication indicative of the at least one cell as being a TN-supporting cell.

In one configuration, when the UE is a TN-supporting UE, the UE may be barred or not barred from selecting the at least one cell for communication based on a third barring indication in a SIB 1 regardless of a fourth barring indication in the MIB, and when the UE is an NTN-supporting UE, the UE may be barred or not barred from selecting the at least one cell for communication based on the fourth barring indication in the MIB regardless of the third barring indication in the SIB 1.

In one configuration, when the UE is a TN-supporting UE, the UE may be barred or not barred from selecting the at least one cell for communication based on a first barring indication in the MIB, when the UE is an NTN-supporting UE, the UE may be barred or not barred from selecting the at least one cell for communication based on the first barring indication in the MIB and at least one additional indication in the MIB, and when the UE is the NTN-supporting UE, the UE may be barred from selecting the at least one cell for communication based on the first barring indication in the MIB indicative of a bar or the at least one additional indication in the MIB indicative of an absence of a SIB 1 in the at least one cell.

In one configuration, when the UE is a TN-supporting UE, the UE may be barred or not barred from selecting the at least one cell for communication based on a first barring indication in the MIB, when the UE is an NTN-supporting UE, the UE may be barred or not barred from selecting the at least one cell for communication based on at least one additional indication in the MIB when the first barring indication in the MIB indicates a bar, and when the UE is the NTN-supporting UE, the UE may be barred from selecting the at least one cell for communication based on the at least one additional indication in the MIB indicative of a bar of NTN-supporting UEs in the at least one cell when the first barring indication in the MIB indicates a bar.

In one configuration, when the UE is a TN-supporting UE, the UE may be barred or not barred from selecting the at least one cell for communication based on a first barring indication in the MIB, and when the UE is an NTN-supporting UE, the UE may be barred or not barred from selecting the at least one cell for communication based on a SIB 1 regardless of the first barring indication in the MIB.

In one configuration, when the UE is the NTN-supporting UE, the UE may be barred from selecting the at least one cell for communication based on the SIB 1 not scheduling at least one additional SIB including NTN-related information regardless of the first barring indication in the MIB.

In one configuration, when the UE is the NTN-supporting UE, the UE may be barred or not barred from selecting the at least one cell for communication based on an indication in the SIB 1 regardless of the first barring indication in the MIB.

In one configuration, when the UE is the TN-supporting UE, the UE may be barred or not barred from selecting the at least one cell for communication based further on the indication in the SIB 1.

In one configuration, the indication in the SIB 1 may be indicative of whether at least one of NTN LEO access or NTN GEO access is barred.

Figure 7:
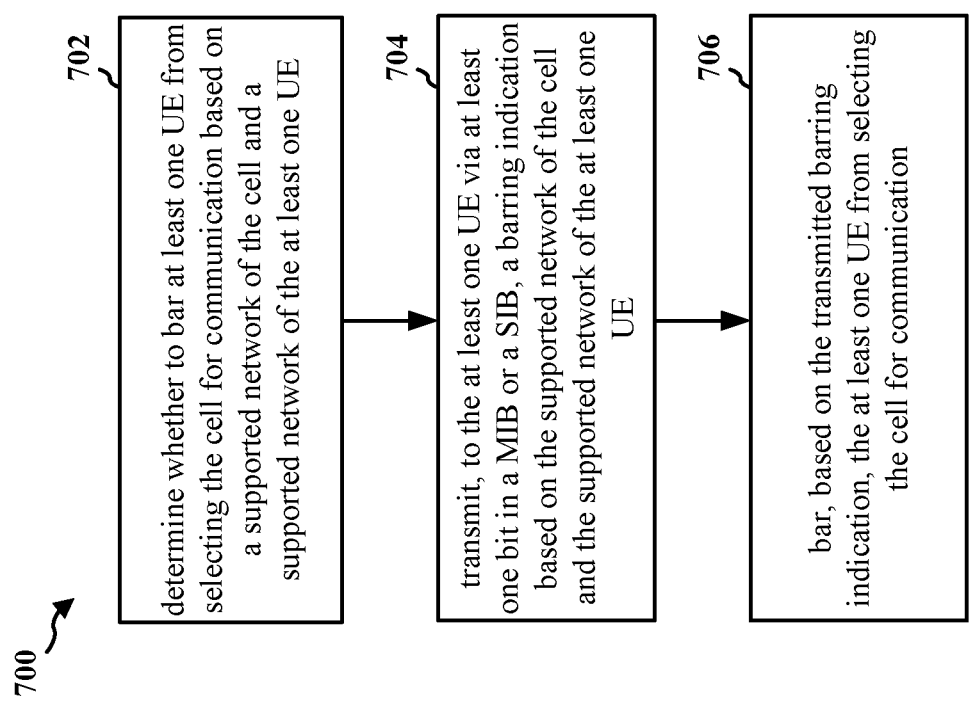
FIG. 7 is a flowchart of a method of wireless communication.

FIG. 7 is a flowchart 700 of a method of wireless communication. The method may be performed by a base station/cell (e.g., the base station/cell 102/180/402/404/406/408/504; the apparatus 902). At 702, the cell may determine whether to bar at least one UE from selecting the cell for communication based on a supported network of the cell and a supported network of the at least one UE. The supported network of the cell may correspond to a TN or an NTN, and the supported network of the at least one UE may correspond to a TN or an NTN. For example, 702 may be performed by the barring component 940 in FIG. 9. Referring to FIG. 5, at 506, the cell 504 may determine whether to bar at least one UE 502 from selecting the cell 504 for communication based on a supported network of the cell 504 and a supported network of the at least one UE 502.

At 704, the cell may transmit, to the at least one UE via at least one bit in a MIB or a SIB, a barring indication based on the supported network of the cell and the supported network of the at least one UE. For example, 704 may be performed by the barring component 940 in FIG. 9. Referring to FIG. 5, at 508, the cell 504 may transmit, to the at least one UE 502 via at least one bit in a MIB or a SIB, a barring indication based on the supported network of the cell 504 and the supported network of the at least one UE 502.

At 706, the cell may bar, based on the transmitted barring indication, the at least one UE from selecting the cell for communication. For example, 706 may be performed by the barring component 940 in FIG. 9. Referring to FIG. 5, at 512, the cell 504 may bar, based on the transmitted barring indication, the at least one UE 502 from selecting the cell 504 for communication.

In one configuration, the communication may correspond to the at least one UE camping on the cell. Referring to FIG. 5, the communication may correspond to the at least one UE 502 camping on the cell 504.

In one configuration, the at least one UE may be barred from selecting the cell for communication for a time period.

In one configuration, the at least one UE may be barred from selecting the cell for communication for a duration of the UE storing information about barring access to the cell, and the information about barring access to the cell includes at least one of a PCID or a frequency of the cell.

In one configuration, a TN-supporting UE of the at least one UE may be barred from selecting the cell for communication when the cell is an NTN-supporting cell, and an NTN-supporting UE of the at least one UE may be barred from selecting the cell for communication when the cell is a TN-supporting cell.

In one configuration, a TN-supporting UE of the at least one UE may be barred or not barred from selecting the cell for communication based on a first barring indication in the MIB regardless of a second barring indication in the MIB, and an NTN-supporting UE of the at least one UE may be barred or not barred from selecting the cell for communication based on the second barring indication in the MIB regardless of the first barring indication in the MIB.

In one configuration, the MIB may include a cell type indication indicative of the cell as being either a TN-supporting cell or an NTN-supporting cell, and an NTN-supporting UE of the at least one UE may be barred or not barred from selecting the cell for communication based on the cell type indication and a third barring indication in a SIB 1, and the NTN-supporting UE of the at least one UE may be barred from selecting the cell for communication based on the cell type indication indicative of the cell as being a TN-supporting cell.

In one configuration, a TN-supporting UE of the at least one UE may be barred or not barred from selecting the cell for communication based on a third barring indication in a SIB 1 regardless of a fourth barring indication in the MIB, and an NTN-supporting UE of the at least one UE may be barred or not barred from selecting the cell for communication based on the fourth barring indication in the MIB regardless of the third barring indication in the SIB 1.

In one configuration, a TN-supporting UE of the at least one UE may be barred or not barred from selecting the cell for communication based on a first barring indication in the MIB, an NTN-supporting UE of the at least one UE may be barred or not barred from selecting the cell for communication based on the first barring indication in the MIB and at least one additional indication in the MIB, and the NTN-supporting UE of the at least one UE may be barred from selecting the cell for communication based on the first barring indication in the MIB indicative of a bar or the at least one additional indication in the MIB indicative of an absence of a SIB 1 in the cell.

In one configuration, a TN-supporting UE of the at least one UE may be barred or not barred from selecting the cell for communication based on a first barring indication in the MIB, an NTN-supporting UE of the at least one UE may be barred or not barred from selecting the cell for communication based on at least one additional indication in the MIB when the first barring indication in the MIB indicates a bar, and the NTN-supporting UE of the at least one UE may be barred from selecting the cell for communication based on the at least one additional indication in the MIB indicative of a bar of NTN-supporting UEs in the cell when the first barring indication in the MIB indicates a bar.

In one configuration, a TN-supporting UE of the at least one UE may be barred or not barred from selecting the cell for communication based on a first barring indication in the MIB, and an NTN-supporting UE of the at least one UE may be barred or not barred from selecting the cell for communication based on a SIB 1 regardless of the first barring indication in the MIB.

In one configuration, the NTN-supporting UE of the at least one UE may be barred from selecting the cell for communication based on the SIB 1 not scheduling at least one additional SIB including NTN-related information regardless of the first barring indication in the MIB.

In one configuration, the NTN-supporting UE of the at least one UE may be barred or not barred from selecting the cell for communication based on an indication in the SIB 1 regardless of the first barring indication in the MIB.

In one configuration, the TN-supporting UE of the at least one UE may be barred or not barred from selecting the cell for communication based further on the indication in the SIB 1.

In one configuration, the indication in the SIB 1 may be indicative of whether at least one of NTN LEO access or NTN GEO access is barred.

In one configuration, a TN-supporting UE of the at least one UE may be barred or not barred from selecting the cell for communication based on a third barring indication in a SIB 1 regardless of a fifth barring indication in the SIB 1, and an NTN-supporting UE of the at least one UE may be barred or not barred from selecting the cell for communication based on the fifth barring indication in the SIB 1 regardless of the third barring indication in the SIB 1.

Figure 8:
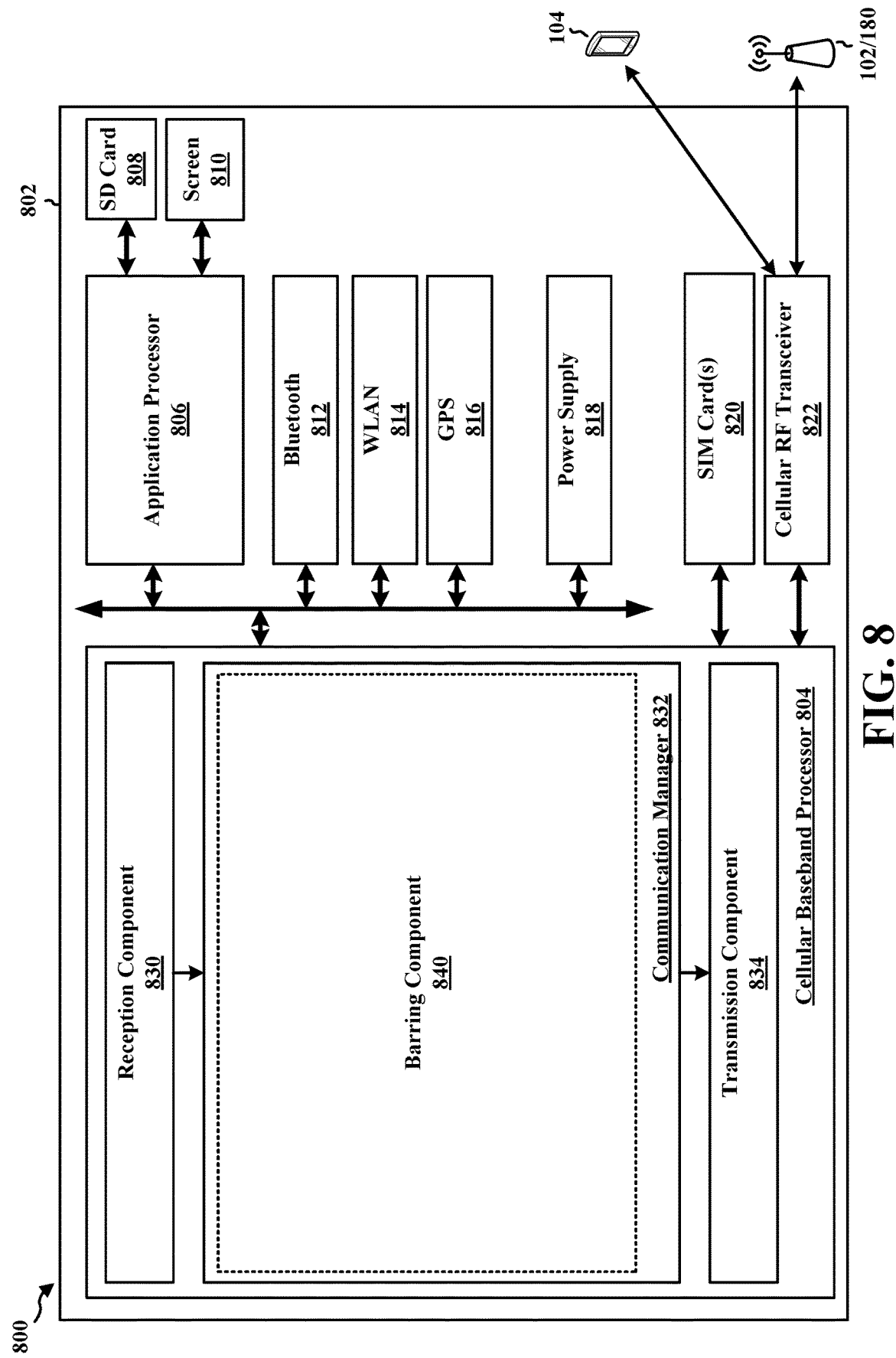
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a barring component 840 that is configured to receive, from at least one cell via at least one bit in a MIB or a SIB, a barring indication based on a supported network of the at least one cell and a supported network of the UE, e.g., as described in connection with 602 in FIG. 6. The barring component 840 may be configured to skip, based on the received barring indication, a selection of the at least one cell for communication, e.g., as described in connection with 604 in FIG. 6.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from at least one cell via at least one bit in a MIB or a SIB, a barring indication based on a supported network of the at least one cell and a supported network of the UE. The supported network of the cell may correspond to a TN or an NTN, and the supported network of the at least one UE may correspond to a TN or an NTN. The apparatus 802 may include means for skipping, based on the received barring indication, a selection of the at least one cell for communication.

In one configuration, the communication may correspond to the at least one UE camping on the at least one cell. In one configuration, the at least one UE may be barred from selecting the at least one cell for communication for a time period. The apparatus may further include means for selecting the at least one cell for communication after the time period. In one configuration, the at least one UE may be barred from selecting the at least one cell for communication for a duration of the UE storing information about barring access to the at least one cell, and the information about barring access to the at least one cell may include at least one of a PCID or a frequency of the at least one cell. In one configuration, when the UE is a TN-supporting UE, the UE may be barred from selecting the at least one cell for communication when the at least one cell is an NTN-supporting cell, and when the UE is an NTN-supporting UE, the UE may be barred from selecting the at least one cell for communication when the at least one cell is a TN-supporting cell. In one configuration, when the UE is a TN-supporting UE, the UE may be barred or not barred from selecting the at least one cell for communication based on a first barring indication in the MIB regardless of a second barring indication in the MIB, and when the UE is an NTN-supporting UE, the UE may be barred or not barred from selecting the at least one cell for communication based on the second barring indication in the MIB regardless of the first barring indication in the MIB. In one configuration, the MIB may include a cell type indication indicative of the at least one cell as being either a TN-supporting cell or an NTN-supporting cell, and when the UE is an NTN-supporting UE, the UE may be barred or not barred from selecting the at least one cell for communication based on the at least one cell type indication and a third barring indication in a SIB 1, and the UE may be barred from selecting the at least one cell for communication based on the at least one cell type indication indicative of the at least one cell as being a TN-supporting cell. In one configuration, when the UE is a TN-supporting UE, the UE may be barred or not barred from selecting the at least one cell for communication based on a third barring indication in a SIB 1 regardless of a fourth barring indication in the MIB, and when the UE is an NTN-supporting UE, the UE may be barred or not barred from selecting the at least one cell for communication based on the fourth barring indication in the MIB regardless of the third barring indication in the SIB 1. In one configuration, when the UE is a TN-supporting UE, the UE may be barred or not barred from selecting the at least one cell for communication based on a first barring indication in the MIB, when the UE is an NTN-supporting UE, the UE may be barred or not barred from selecting the at least one cell for communication based on the first barring indication in the MIB and at least one additional indication in the MIB, and when the UE is the NTN-supporting UE, the UE may be barred from selecting the at least one cell for communication based on the first barring indication in the MIB indicative of a bar or the at least one additional indication in the MIB indicative of an absence of a SIB 1 in the at least one cell. In one configuration, when the UE is a TN-supporting UE, the UE may be barred or not barred from selecting the at least one cell for communication based on a first barring indication in the MIB, when the UE is an NTN-supporting UE, the UE may be barred or not barred from selecting the at least one cell for communication based on at least one additional indication in the MIB when the first barring indication in the MIB indicates a bar, and when the UE is the NTN-supporting UE, the UE may be barred from selecting the at least one cell for communication based on the at least one additional indication in the MIB indicative of a bar of NTN-supporting UEs in the at least one cell when the first barring indication in the MIB indicates a bar. In one configuration, when the UE is a TN-supporting UE, the UE may be barred or not barred from selecting the at least one cell for communication based on a first barring indication in the MIB, and when the UE is an NTN-supporting UE, the UE may be barred or not barred from selecting the at least one cell for communication based on a SIB 1 regardless of the first barring indication in the MIB. In one configuration, when the UE is the NTN-supporting UE, the UE may be barred from selecting the at least one cell for communication based on the SIB 1 not scheduling at least one additional SIB including NTN-related information regardless of the first barring indication in the MIB. In one configuration, when the UE is the NTN-supporting UE, the UE may be barred or not barred from selecting the at least one cell for communication based on an indication in the SIB 1 regardless of the first barring indication in the MIB. In one configuration, when the UE is the TN-supporting UE, the UE may be barred or not barred from selecting the at least one cell for communication based further on the indication in the SIB 1. In one configuration, the indication in the SIB 1 may be indicative of whether at least one of NTN LEO access or NTN GEO access is barred. In one configuration, when the UE is a TN-supporting UE, the may be barred or not barred from selecting the cell for communication based on a third barring indication in a SIB 1 regardless of a fifth barring indication in the SIB 1, and when the UE is an NTN-supporting UE, the UE may be barred or not barred from selecting the cell for communication based on the fifth barring indication in the SIB 1 regardless of the third barring indication in the SIB 1.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
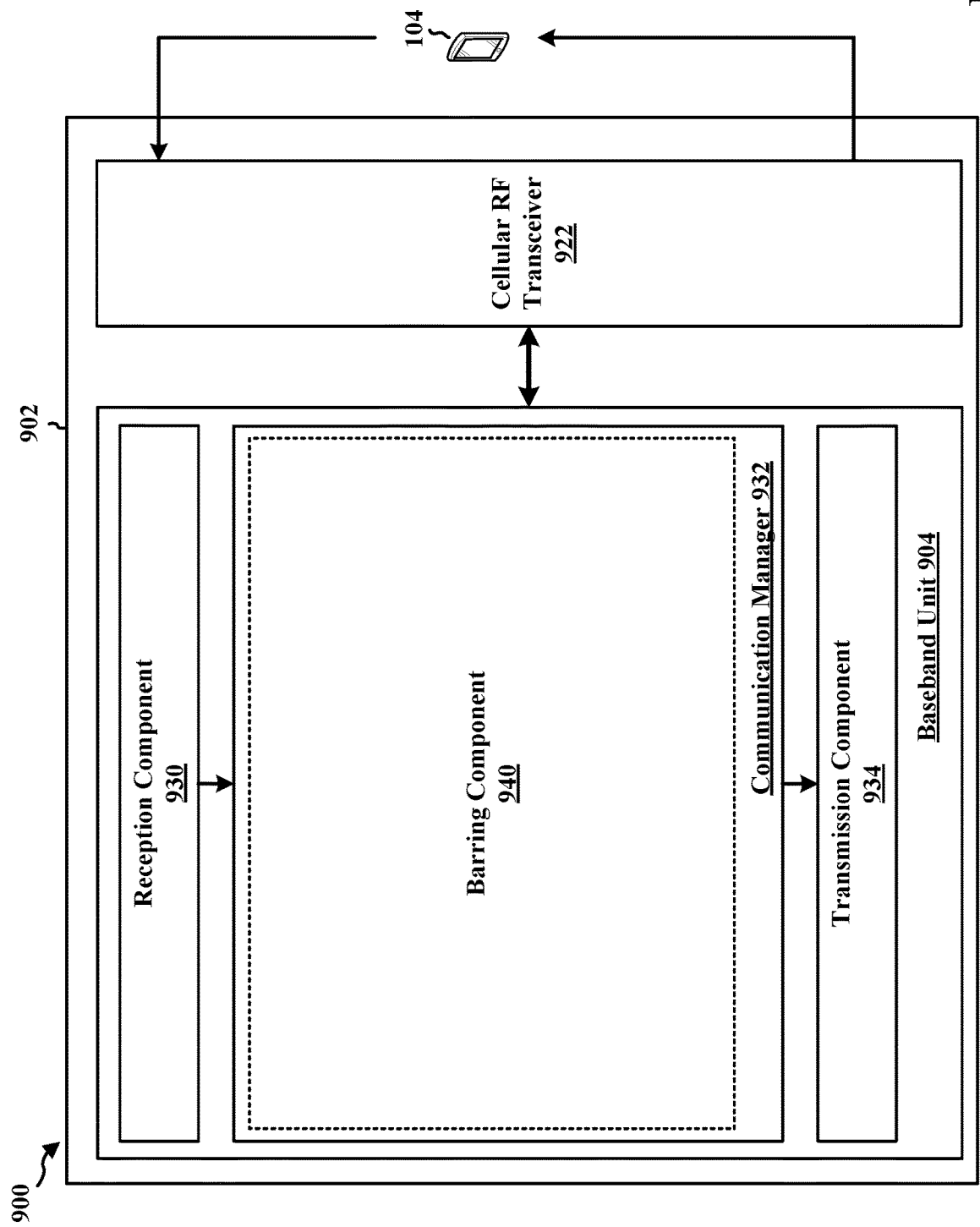
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a barring component 940 that may be configured to determine whether to bar at least one UE from selecting the cell for communication based on a supported network of the cell and a supported network of the at least one UE e.g., as described in connection with 702 in FIG. 7. The barring component 940 may be configured to transmit, to the at least one UE via at least one bit in a MIB or a SIB, a barring indication based on the supported network of the cell and the supported network of the at least one UE, e.g., as described in connection with 704 in FIG. 7. The barring component 940 may be configured to bar, based on the transmitted barring indication, the at least one UE from selecting the cell for communication, e.g., as described in connection with 706 in FIG. 7.

The apparatus may include additional components that perform each of the blocks of the algorithm in the aforementioned flowcharts of FIGS. 5 and 7. As such, each block in the aforementioned flowcharts of FIGS. 5 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for determining whether to bar at least one UE from selecting the cell for communication based on a supported network of the cell and a supported network of the at least one UE. The supported network of the cell may correspond to a TN or an NTN, and the supported network of the at least one UE may correspond to a TN or an NTN. The apparatus 902 may include means for transmitting, to the at least one UE via at least one bit in a MIB or a SIB, a barring indication based on the supported network of the cell and the supported network of the at least one UE. The apparatus 902 may include means for barring, based on the transmitted barring indication, the at least one UE from selecting the cell for communication.

In one configuration, the communication may correspond to the at least one UE camping on the cell. In one configuration, the at least one UE may be barred from selecting the cell for communication for a time period. In one configuration, the at least one UE may be barred from selecting the cell for communication for a duration of the UE storing information about barring access to the cell, and the information about barring access to the cell includes at least one of a PCID or a frequency of the cell. In one configuration, a TN-supporting UE of the at least one UE may be barred from selecting the cell for communication when the cell is an NTN-supporting cell, and an NTN-supporting UE of the at least one UE may be barred from selecting the cell for communication when the cell is a TN-supporting cell. In one configuration, a TN-supporting UE of the at least one UE may be barred or not barred from selecting the cell for communication based on a first barring indication in the MIB regardless of a second barring indication in the MIB, and an NTN-supporting UE of the at least one UE may be barred or not barred from selecting the cell for communication based on the second barring indication in the MIB regardless of the first barring indication in the MIB. In one configuration, the MIB may include a cell type indication indicative of the cell as being either a TN-supporting cell or an NTN-supporting cell, and an NTN-supporting UE of the at least one UE may be barred or not barred from selecting the cell for communication based on the cell type indication and a third barring indication in a SIB 1, and the NTN-supporting UE of the at least one UE may be barred from selecting the cell for communication based on the cell type indication indicative of the cell as being a TN-supporting cell. In one configuration, a TN-supporting UE of the at least one UE may be barred or not barred from selecting the cell for communication based on a third barring indication in a SIB 1 regardless of a fourth barring indication in the MIB, and an NTN-supporting UE of the at least one UE may be barred or not barred from selecting the cell for communication based on the fourth barring indication in the MIB regardless of the third barring indication in the SIB 1. In one configuration, a TN-supporting UE of the at least one UE may be barred or not barred from selecting the cell for communication based on a first barring indication in the MIB, an NTN-supporting UE of the at least one UE may be barred or not barred from selecting the cell for communication based on the first barring indication in the MIB and at least one additional indication in the MIB, and the NTN-supporting UE of the at least one UE may be barred from selecting the cell for communication based on the first barring indication in the MIB indicative of a bar or the at least one additional indication in the MIB indicative of an absence of a SIB 1 in the cell. In one configuration, a TN-supporting UE of the at least one UE may be barred or not barred from selecting the cell for communication based on a first barring indication in the MIB, an NTN-supporting UE of the at least one UE may be barred or not barred from selecting the cell for communication based on at least one additional indication in the MIB when the first barring indication in the MIB indicate s a bar, and the NTN-supporting UE of the at least one UE may be barred from selecting the cell for communication based on the at least one additional indication in the MIB indicative of a bar of NTN-supporting UEs in the cell when the first barring indication in the MIB indicates a bar. In one configuration, a TN-supporting UE of the at least one UE may be barred or not barred from selecting the cell for communication based on a first barring indication in the MIB, and an NTN-supporting UE of the at least one UE may be barred or not barred from selecting the cell for communication based on a SIB 1 regardless of the first barring indication in the MIB. In one configuration, the NTN-supporting UE of the at least one UE may be barred from selecting the cell for communication based on the SIB 1 not scheduling at least one additional SIB including NTN-related information regardless of the first barring indication in the MIB. In one configuration, the NTN-supporting UE of the at least one UE may be barred or not barred from selecting the cell for communication based on an indication in the SIB 1 regardless of the first barring indication in the MIB. In one configuration, the TN-supporting UE of the at least one UE may be barred or not barred from selecting the cell for communication based further on the indication in the SIB 1. In one configuration, the indication in the SIB 1 may be indicative of whether at least one of NTN LEO access or NTN GEO access is barred. In one configuration, a TN-supporting UE of the at least one UE may be barred or not barred from selecting the cell for communication based on a third barring indication in a SIB 1 regardless of a fifth barring indication in the SIB 1, and an NTN-supporting UE of the at least one UE may be barred or not barred from selecting the cell for communication based on the fifth barring indication in the SIB 1 regardless of the third barring indication in the SIB 1.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

According to aspects described herein, a UE may receive, from at least one cell via at least one bit in a MIB or a SIB, a barring indication based on a supported network of the at least one cell and a supported network of the UE. The supported network of the at least one cell may correspond to a TN or an NTN, and the supported network of the UE may correspond to a TN or an NTN. The UE may skip, based on the received barring indication, a selection of the at least one cell for communication. Various ways of separately indicating the cell barring indication for TN-supporting UEs and for NTN-supporting UEs via the MIB or the SIB have been described. Accordingly, inappropriate camping by a TN-supporting UE on an NTN cell, or inappropriate camping by an NTN-supporting UE on a TN cell may be avoided.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving, from at least one cell via at least one bit in a MIB or a SIB, a barring indication based on a supported network of the at least one cell and a supported network of the UE, the supported network of the at least one cell corresponding to a TN or an NTN, the supported network of the UE corresponding to a TN or an NTN; and skipping, based on the received barring indication, a selection of the at least one cell for communication.

Aspect 2 is the method of aspect 1, where the communication corresponds to the at least one UE camping on the at least one cell.

Aspect 3 is the method of any of aspects 1 and 2, where the at least one UE is barred from selecting the at least one cell for communication for a time period, the method further including: selecting the at least one cell for communication after the time period.

Aspect 4 is the method of any of aspects 1 to 3, where the at least one UE is barred from selecting the at least one cell for communication for a duration of the UE storing information about barring access to the at least one cell, and the information about barring access to the at least one cell includes at least one of a PCID or a frequency of the at least one cell.

Aspect 5 is the method of any of aspects 1 to 4, where when the UE is a TN-supporting UE, the UE is barred from selecting the at least one cell for communication when the at least one cell is an NTN-supporting cell, and when the UE is an NTN-supporting UE, the UE is barred from selecting the at least one cell for communication when the at least one cell is a TN-supporting cell.

Aspect 6 is the method of any of aspects 1 to 4, where when the UE is a TN-supporting UE, the UE is barred or not barred from selecting the at least one cell for communication based on a first barring indication in the MIB regardless of a second barring indication in the MIB, and when the UE is an NTN-supporting UE, the UE is barred or not barred from selecting the at least one cell for communication based on the second barring indication in the MIB regardless of the first barring indication in the MIB.

Aspect 7 is the method of any of aspects 1 to 4, where the MIB includes a cell type indication indicative of the at least one cell as being either a TN-supporting cell or an NTN-supporting cell, and when the UE is an NTN-supporting UE, the UE is barred or not barred from selecting the at least one cell for communication based on the at least one cell type indication and a third barring indication in a SIB 1, and the UE is barred from selecting the at least one cell for communication based on the at least one cell type indication indicative of the at least one cell as being a TN-supporting cell.

Aspect 8 is the method of any of aspects 1 to 4, where when the UE is a TN-supporting UE, the UE is barred or not barred from selecting the at least one cell for communication based on a third barring indication in a SIB 1 regardless of a fourth barring indication in the MIB, and when the UE is an NTN-supporting UE, the UE is barred or not barred from selecting the at least one cell for communication based on the fourth barring indication in the MIB regardless of the third barring indication in the SIB 1.

Aspect 9 is the method of any of aspects 1 to 4, where when the UE is a TN-supporting UE, the UE is barred or not barred from selecting the at least one cell for communication based on a first barring indication in the MIB, and when the UE is an NTN-supporting UE, the UE is barred or not barred from selecting the at least one cell for communication based on the first barring indication in the MIB and at least one additional indication in the MIB, and where when the UE is the NTN-supporting UE, the UE is barred from selecting the at least one cell for communication based on the first barring indication in the MIB indicative of a bar or the at least one additional indication in the MIB indicative of an absence of a SIB 1 in the at least one cell.

Aspect 10 is the method of any of aspects 1 to 4, where when the UE is a TN-supporting UE, the UE is barred or not barred from selecting the at least one cell for communication based on a first barring indication in the MIB, and when the UE is an NTN-supporting UE, the UE is barred or not barred from selecting the at least one cell for communication based on at least one additional indication in the MIB when the first barring indication in the MIB indicates a bar, and where when the UE is the NTN-supporting UE, the UE is barred from selecting the at least one cell for communication based on the at least one additional indication in the MIB indicative of a bar of NTN-supporting UEs in the at least one cell when the first barring indication in the MIB indicates a bar.

Aspect 11 is the method of any of aspects 1 to 4, where when the UE is a TN-supporting UE, the UE is barred or not barred from selecting the at least one cell for communication based on a first barring indication in the MIB, and when the UE is an NTN-supporting UE, the UE is barred or not barred from selecting the at least one cell for communication based on a SIB 1 regardless of the first barring indication in the MIB.

Aspect 12 is the method of aspect 11, where when the UE is the NTN-supporting UE, the UE is barred from selecting the at least one cell for communication based on the SIB 1 not scheduling at least one additional SIB including NTN-related information regardless of the first barring indication in the MIB.

Aspect 13 is the method of aspect 11, where when the UE is the NTN-supporting UE, the UE is barred or not barred from selecting the at least one cell for communication based on an indication in the SIB 1 regardless of the first barring indication in the MIB.

Aspect 14 is the method of aspect 13, where when the UE is the TN-supporting UE, the UE is barred or not barred from selecting the at least one cell for communication based further on the indication in the SIB 1.

Aspect 15 is the method of any of aspects 13 and 14, where the indication in the SIB 1 is indicative of whether at least one of NTN LEO access or NTN GEO access is barred.

Aspect 16 is the method of any of aspects 1 to 4, where when the UE is a TN-supporting UE, the UE is barred or not barred from selecting the cell for communication based on a third barring indication in a SIB 1 regardless of a fifth barring indication in the SIB 1, and when the UE is an NTN-supporting UE, the UE is barred or not barred from selecting the cell for communication based on the fifth barring indication in the SIB 1 regardless of the third barring indication in the SIB 1.

Aspect 17 is a method of wireless communication at a cell, including: determining whether to bar at least one UE from selecting the cell for communication based on a supported network of the cell and a supported network of the at least one UE, the supported network of the cell corresponding to a TN or an NTN, the supported network of the at least one UE corresponding to a TN or an NTN; transmitting, to the at least one UE via at least one bit in a MIB or a SIB, a barring indication based on the supported network of the cell and the supported network of the at least one UE; and barring, based on the transmitted barring indication, the at least one UE from selecting the cell for communication.

Aspect 18 is the method of aspect 17, where the communication corresponds to the at least one UE camping on the cell.

Aspect 19 is the method of any of aspects 17 and 18, where the at least one UE is barred from selecting the cell for communication for a time period.

Aspect 20 is the method of any of aspects 17 to 19, where the at least one UE is barred from selecting the cell for communication for a duration of the UE storing information about barring access to the cell, and the information about barring access to the cell includes at least one of a PCID or a frequency of the cell.

Aspect 21 is the method of any of aspects 17 to 20, where a TN-supporting UE of the at least one UE is barred from selecting the cell for communication when the cell is an NTN-supporting cell, and an NTN-supporting UE of the at least one UE is barred from selecting the cell for communication when the cell is a TN-supporting cell.

Aspect 22 is the method of any of aspects 17 to 20, where a TN-supporting UE of the at least one UE is barred or not barred from selecting the cell for communication based on a first barring indication in the MIB regardless of a second barring indication in the MIB, and an NTN-supporting UE of the at least one UE is barred or not barred from selecting the cell for communication based on the second barring indication in the MIB regardless of the first barring indication in the MIB.

Aspect 23 is the method of any of aspects 17 to 20, where the MIB includes a cell type indication indicative of the cell as being either a TN-supporting cell or an NTN-supporting cell, and an NTN-supporting UE of the at least one UE is barred or not barred from selecting the cell for communication based on the cell type indication and a third barring indication in a SIB 1, and the NTN-supporting UE of the at least one UE is barred from selecting the cell for communication based on the cell type indication indicative of the cell as being a TN-supporting cell.

Aspect 24 is the method of any of aspects 17 to 20, where a TN-supporting UE of the at least one UE is barred or not barred from selecting the cell for communication based on a third barring indication in a SIB 1 regardless of a fourth barring indication in the MIB, and an NTN-supporting UE of the at least one UE is barred or not barred from selecting the cell for communication based on the fourth barring indication in the MIB regardless of the third barring indication in the SIB 1.

Aspect 25 is the method of any of aspects 17 to 20, where a TN-supporting UE of the at least one UE is barred or not barred from selecting the cell for communication based on a first barring indication in the MIB, an NTN-supporting UE of the at least one UE is barred or not barred from selecting the cell for communication based on the first barring indication in the MIB and at least one additional indication in the MIB, and the NTN-supporting UE of the at least one UE is barred from selecting the cell for communication based on the first barring indication in the MIB indicative of a bar or the at least one additional indication in the MIB indicative of an absence of a SIB 1 in the cell.

Aspect 26 is the method of any of aspects 17 to 20, where a TN-supporting UE of the at least one UE is barred or not barred from selecting the cell for communication based on a first barring indication in the MIB, an NTN-supporting UE of the at least one UE is barred or not barred from selecting the cell for communication based on at least one additional indication in the MIB when the first barring indication in the MIB indicate s a bar, and the NTN-supporting UE of the at least one UE is barred from selecting the cell for communication based on the at least one additional indication in the MIB indicative of a bar of NTN-supporting UEs in the cell when the first barring indication in the MIB indicates a bar.

Aspect 27 is the method of any of aspects 17 to 20, where a TN-supporting UE of the at least one UE is barred or not barred from selecting the cell for communication based on a first barring indication in the MIB, and an NTN-supporting UE of the at least one UE is barred or not barred from selecting the cell for communication based on a SIB 1 regardless of the first barring indication in the MIB.

Aspect 28 is the method of aspect 27, where the NTN-supporting UE of the at least one UE is barred from selecting the cell for communication based on the SIB 1 not scheduling at least one additional SIB including NTN-related information regardless of the first barring indication in the MIB.

Aspect 29 is the method of aspect 27, where the NTN-supporting UE of the at least one UE is barred or not barred from selecting the cell for communication based on an indication in the SIB 1 regardless of the first barring indication in the MIB.

Aspect 30 is the method of aspect 29, where the TN-supporting UE of the at least one UE is barred or not barred from selecting the cell for communication based further on the indication in the SIB 1.

Aspect 31 is the method of any of aspects 29 and 30, where the indication in the SIB 1 is indicative of whether at least one of NTN LEO access or NTN GEO access is barred.

Aspect 32 is the method of any of aspects 17 to 20, where a TN-supporting UE of the at least one UE is barred or not barred from selecting the cell for communication based on a third barring indication in a SIB 1 regardless of a fifth barring indication in the SIB 1, and an NTN-supporting UE of the at least one UE is barred or not barred from selecting the cell for communication based on the fifth barring indication in the SIB 1 regardless of the third barring indication in the SIB 1.

Aspect 33 is an apparatus for wireless communication including at least one processor coupled to a memory and configured to implement a method as in any of aspects 1 to 32.

Aspect 34 is an apparatus for wireless communication including means for implementing a method as in any of aspects 1 to 32.

Aspect 35 is a computer-readable medium storing computer executable code, where the code when executed by a processor causes the processor to implement a method as in any of aspects 1 to 32.

What is claimed is:

1. An apparatus for wireless communication at a user equipment (UE), comprising:
   at least one memory; and
   at least one processor coupled to the at least one memory and, based at least in part on information stored in the at least one memory, the at least one processor, individually or in any combination, is configured to:
   receive, from at least one cell, a first barring indication in a master information block (MIB) and a second barring indication in a system information block 1 (SIB 1), wherein the at least one cell corresponds to a terrestrial network (TN) or a non-terrestrial network (NTN);
   determine, based on a supported network of the UE being the NTN, that the UE is barred or not barred from selecting the at least one cell for communication based on the second indication in the SIB 1 regardless of the first barring indication in the MIB; and
   skip, based on the determination, a selection of the at least one cell for communication, when the UE is barred from selecting the at least one cell for communication for a time period;
   wherein the UE is barred from selecting the at least one cell for communication for a duration of the UE storing information about barring access to the at least one cell, and the information about barring access to the at least one cell comprises at least one of a physical cell identifier (PCID) or a frequency of the at least one cell.

2. The apparatus of claim 1, wherein the communication corresponds to the UE camping on the at least one cell.

3. The apparatus of claim 1, wherein the at least one processor, individually or in any combination, is further configured to:
select the at least one cell for communication after the time period.

4. The apparatus of claim 1, wherein the MIB comprises a cell type indication indicative of the cell as being either a TN-supporting cell or an NTN-supporting cell.

5. The apparatus of claim 1, wherein the UE is barred from selecting the at least one cell for communication when the at least one cell is a TN-supporting cell.

6. The apparatus of claim 1, wherein the UE is barred from selecting the at least one cell for communication based on the SIB 1 not scheduling at least one additional SIB including NTN-related information regardless of the first barring indication in the MIB.

7. The apparatus of claim 1, wherein the second barring indication in the SIB 1 is indicative of whether at least one of NTN low earth orbit (LEO) access or NTN geostationary (GEO) access is barred.

8. An apparatus for wireless communication at a user equipment (UE), comprising:
at least one memory; and
at least one processor coupled to the at least one memory and, based at least in part on information stored in the at least one memory, the at least one processor, individually or in any combination, is configured to:
receive, from at least one cell, a first barring indication and a second barring indication in a system information block 1 (SIB 1), wherein the at least one cell corresponds to a terrestrial network (TN) or a non-terrestrial network (NTN);
determine, based on a supported network of the UE being the NTN, the UE is barred or not barred from selecting the at least one cell for communication based on the second barring indication regardless of the first barring indication; and
skip, based on the determination, a selection of the at least one cell for communication, when the UE is barred from selecting the at least one cell for communication for a time period;
wherein the UE is barred from selecting the at least one cell for communication for a duration of the UE storing information about barring access to the at least one cell, and
the information about barring access to the at least one cell comprises at least one of a physical cell identifier (PCID) or a frequency of the at least one cell.

9. The apparatus of claim 8, wherein the communication corresponds to the UE camping on the at least one cell.

10. The apparatus of claim 8, wherein the at least one processor, individually or in any combination, is further configured to:
select the at least one cell for communication after the time period.

11. The apparatus of claim 8, wherein the UE is barred from selecting the at least one cell for communication when the at least one cell is a TN-supporting cell.

12. The apparatus of claim 8, wherein the UE is barred from selecting the at least one cell for communication based on the SIB 1 not scheduling at least one additional SIB including NTN-related information regardless of the first barring indication.

13. The apparatus of claim 8, wherein the second barring indication in the SIB 1 is indicative of whether at least one of NTN low earth orbit (LEO) access or NTN geostationary (GEO) access is barred.

14. A method for wireless communication performed by a user equipment (UE), comprising:
receiving, from at least one cell, a first barring indication in a master information block (MIB), and a second barring indication in a system information block 1 (SIB 1), wherein the at least one cell corresponding to a terrestrial network (TN) or a non-terrestrial network (NTN);
determining, based on a supported network of the UE being a NTN, that the UE is barred or not barred from selecting the at least one cell for communication based on the second indication in the SIB 1 regardless of the first barring indication in the MIB; and
skipping, based on the determination, a selection of the at least one cell for communication, when the UE is barred from selecting the at least one cell for communication for a time period;
wherein the UE is barred from selecting the at least one cell for communication for a duration of the UE storing information about barring access to the at least one cell, and
the information about barring access to the at least one cell comprises at least one of a physical cell identifier (PCID) or a frequency of the at least one cell.

15. The method of claim 14, wherein the communication corresponds to the UE camping on the at least one cell.

16. The method of claim 14, further comprising:
selecting the at least one cell for communication after the time period.

17. The method of claim 14, wherein the MIB comprises a cell type indication indicative of the cell as being either a TN-supporting cell or an NTN-supporting cell.

18. The method of claim 14, wherein the UE is barred from selecting the at least one cell for communication when the at least one cell is a TN-supporting cell.

19. The method of claim 14, wherein the UE is barred from selecting the at least one cell for communication based on the SIB 1 not scheduling at least one additional SIB including NTN-related information regardless of the first barring indication in the MIB.

20. The method of claim 14, wherein the second barring indication in the SIB 1 is indicative of whether at least one of NTN low earth orbit (LEO) access or NTN geostationary (GEO) access is barred.

21. A method for wireless communication performed by a user equipment (UE), comprising:
receiving, from at least one cell, a first barring indication and a second barring indication in system information block 1 (SIB 1), wherein the at least one cell corresponding to a terrestrial network (TN) or a non-terrestrial network (NTN);
determining, based on a supported network of the UE being a NTN, the UE is barred or not barred from selecting the at least one cell for communication based on the second barring indication regardless of the first barring indication; and
skipping, based on the determination, a selection of the at least one cell for communication, when the UE is barred from selecting the at least one cell for communication for a time period;

wherein the at least one UE is barred from selecting the at least one cell for communication for a duration of the UE storing information about barring access to the at least one cell, and the information about barring access to the at least one cell comprises at least one of a physical cell identifier (PCID) or a frequency of the at least one cell.

22. The method of claim 21, wherein the communication corresponds to the UE camping on the at least one cell.

23. The method of claim 21, further comprising:
select the at least one cell for communication after the time period.

24. The method of claim 21, wherein the UE is barred from selecting the at least one cell for communication when the at least one cell is a TN-supporting cell.

25. The method of claim 21, wherein the UE is barred from selecting the at least one cell for communication based on the SIB 1 not scheduling at least one additional SIB including NTN-related information regardless of the first barring indication.

26. The method of claim 21, wherein the second barring indication in the SIB 1 is indicative of whether at least one of NTN low earth orbit (LEO) access or NTN geostationary (GEO) access is barred.

\* \* \* \* \*